United States Patent
Qi et al.

(10) Patent No.: US 9,201,148 B1
(45) Date of Patent: Dec. 1, 2015

(54) TIMING ERROR DETECTOR FOR ADVERSE CHANNEL CONDITIONS

(75) Inventors: Yihong Qi, Santa Clara, CA (US); Jianwei Bei, Rockville, MD (US); Xiaotao Xu, San Jose, CA (US); Victor Lin, Fremont, CA (US)

(73) Assignee: Marvell International Ltd., Hamilton (BM)

( * ) Notice: Subject to any disclaimer, the term of this patent is extended or adjusted under 35 U.S.C. 154(b) by 541 days.

(21) Appl. No.: 12/785,822

(22) Filed: May 24, 2010

Related U.S. Application Data

(60) Provisional application No. 61/180,576, filed on May 22, 2009, provisional application No. 61/303,229, filed on Feb. 10, 2010.

(51) Int. Cl.
*H04B 1/00* (2006.01)
*G01S 19/24* (2010.01)
*H04B 1/7075* (2011.01)

(52) U.S. Cl.
CPC .............. *G01S 19/24* (2013.01); *H04B 1/7075* (2013.01)

(58) Field of Classification Search
CPC .... H04B 1/709; H04B 1/7075; H04B 1/7073; G01S 19/30; G01S 19/235; G01S 19/24; G01S 5/02; G01S 5/0221; H03J 2200/11; H04L 27/2663; H04L 7/042; H04W 56/0035

USPC ......... 375/150, 149, 343, 142, 137, 134, 147, 375/354, 136, 316, 340, 148; 342/357.69, 342/357.63; 370/320; 701/478.5
See application file for complete search history.

(56) References Cited

U.S. PATENT DOCUMENTS

| | | | |
|---|---|---|---|
| 6,496,141 B2 * | 12/2002 | Pippin | 342/357.34 |
| 6,636,558 B1 * | 10/2003 | Schnaufer et al. | 375/150 |
| 7,639,181 B2 * | 12/2009 | Wang et al. | 342/357.59 |
| 7,839,916 B1 * | 11/2010 | Luecke et al. | 375/147 |
| 2002/0101912 A1 | 8/2002 | Phelts et al. | |
| 2005/0124368 A1 | 6/2005 | Diao et al. | |
| 2007/0098055 A1 | 5/2007 | Raman et al. | |
| 2009/0110134 A1 * | 4/2009 | Yuan et al. | 375/371 |
| 2009/0115656 A1 | 5/2009 | Raman et al. | |

OTHER PUBLICATIONS

Ward, et al., "Satellite Signal Acquisition, Tracking, and Data Demodulation," in *Understanding GPS Principles and Applications*, 2nd Ed., pp. 153-241 (Kaplan et al. eds., Artech House 2006).

* cited by examiner

*Primary Examiner* — Leila Malek

(57) ABSTRACT

In a receive system, a plurality of correlators correlate a received signal with a plurality of delayed versions of a reference signal to generate a plurality of correlator outputs. A timing error detector estimates an optimal timing based on a set of correlator outputs, and determines a timing error based on (i) the estimated optimal correlation point and (ii) an existing timing, such that the timing error is hard or soft limited between two positive thresholds and two negative thresholds.

9 Claims, 5 Drawing Sheets

TIMING ERROR DETECTOR FOR ADVERSE CHANNEL CONDITIONS

CROSS-REFERENCE TO RELATED APPLICATION

The present disclosure claims the benefit of U.S. Provisional Patent Application No. 61/180,576, entitled "Multipath Discriminator for Code Tracking Loop in a GPS Receiver," which was filed on May 22, 2009, which is hereby incorporated by reference herein in its entirety. The present disclosure also claims the benefit of U.S. Provisional Patent Application No. 61/303,229, entitled "Multipath Discriminator for Code Tracking Loop in a GPS Receiver," which was filed on Feb. 10, 2010.

FIELD OF THE DISCLOSURE

The present disclosure relates generally timing error estimation in a receive system and, more particularly, to timing error estimation in the presence of multipath interference and/or low signal level.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

The Global Positioning System (GPS) is a U.S. government-supported system for precise position and velocity determination of objects. Orbiting satellites emit coded radio frequency signals that are received and processed by receivers on or near the surface of the earth to obtain pseudorange measurements, approximate instantaneous distances between the satellites and receiver. Because the satellite orbits and signal transmission times are known precisely, the receipt time of a particular signal bit can be used to quantify the transit time or range to the particular satellite. The orbits of the GPS satellites are arranged in multiple planes so that signals can be received from at least four satellites at any point on or near the earth, allowing precise position and velocity measurements of the receiver. Each satellite continually transmits a spread-spectrum signal that is modulated by a pseudo-random noise (PRN) code unique to the satellite. A receiver can therefore identify and separate signals from each satellite into separate channels, process the channel data separately, and combine the processed data to compute the receiver position. In addition to the PRN code, the signals are modulated by slower-varying data signals defining the satellite orbits and other relevant information needed for the computations. The most common PRN code is a binary sequence of 0's and 1's or −1's and +1's that modulates the carrier phase.

In the receiver, local signals corresponding to the known PRN code are generated and correlated with the received signals. The phases of the local signals are adjusted until the local signals correctly track the received signal. Since the time at which each bit of the code sequence is transmitted from the satellite is known, the time of receipt of each bit is a direct measure of the transmit time of the signal from the satellite to the receiver, and therefore a measure of the distance between the two. Based on the computed relative phase of the received signal, the receiver calculates the desired quantities of distance, velocity, etc.

SUMMARY

In one embodiment, a receive system comprises a plurality of correlators to correlate a received signal with a plurality of delayed versions of a reference signal to generate a plurality of correlator outputs. The receive system also comprises a timing error detector to estimate an optimal timing based on a set of correlator outputs, and determine a timing error based on (i) the estimated optimal correlation point and (ii) an existing timing, such that the timing error is hard or soft limited between two positive thresholds and two negative thresholds.

In another embodiment, a method includes receiving a signal, and correlating the received signal with a plurality of delayed versions of a reference signal. The method also includes estimating an optimal timing based on a set of correlator outputs, and determining a timing error based on (i) the estimated optimal timing and (ii) an existing timing. The timing error is hard or soft limited between two positive thresholds and two negative thresholds.

In yet another embodiment, a positioning system receiver comprises a plurality of receiver channel blocks corresponding to a plurality of satellites, and a receiver processing block including a code tracking loop. The code tracking loop includes a plurality of correlators to correlate a received signal with a plurality of delayed versions of a reference signal, and a tracking error detector. The tracking error detector is configured to estimate an optimal timing based on a set of correlation points, and determine a code tracking error based on (i) the chosen optimal timing and (ii) an existing timing, such that the code tracking error is hard or soft limited between two positive thresholds and two negative thresholds.

DETAILED DESCRIPTION

Example timing error estimation methods and apparatus are described herein in the context of the Global Positioning System. It is noted, in light of the disclosure and teachings herein, that similar methods and apparatus are suitable to be utilized in other positioning systems as well, including global and regional positioning systems such as the Galileo system and the GLObal NAvigation Satellite System (GLONASS). It is also noted, in light of the disclosure and teachings herein, that similar methods and apparatus are suitable to be utilized in other communication systems such as communication systems in which a reference signal is utilized, such as a code division multiplexing (CDM) and ultra wide band (UWB) systems.

Figure 1:
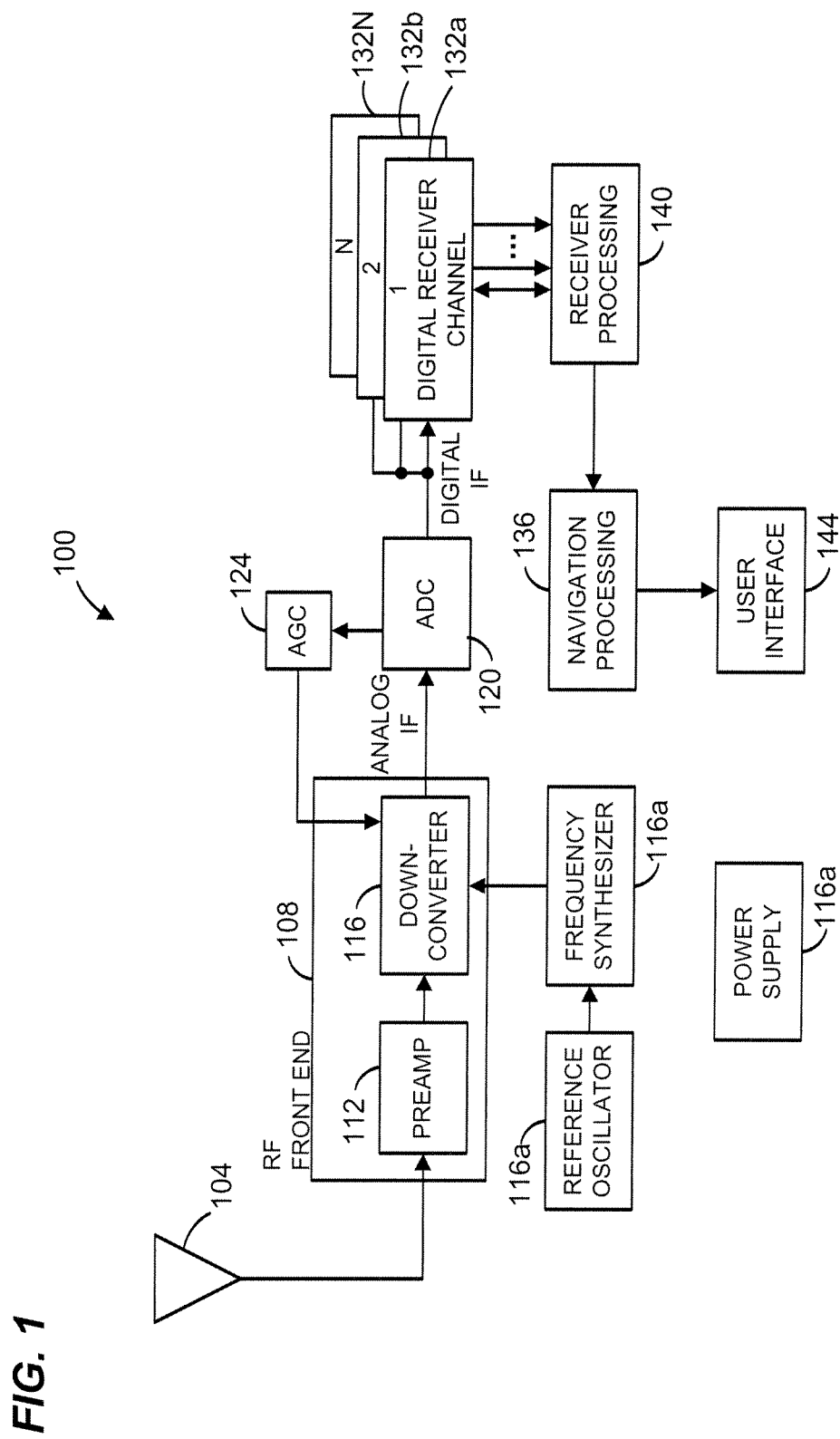
FIG. 1 is a block diagram of an example global positioning system (GPS) receiver, according to an embodiment.

FIG. 1 is a block diagram of an example GPS receiver 100, according to an embodiment. The receiver 100 includes an antenna coupled to a radio frequency (RF) front end unit 108 having a preamplifier 112 coupled to a down-converter 116. The down-converter 116 down converts a received RF signal from an RF to an intermediate frequency (IF) to generate an analog IF signal. An analog-to-digital converter (ADC) 120 is coupled to the RF front end unit 108 and converts the analog IF signal to a digital IF signal. An automatic gain control (AGC) unit 124 is coupled to the ADC 120 and receives an output of the ADC 120. The AGC unit 124 controls a variable gain unit in the down-converter 116 based on the output of the AGC unit 124.

A plurality of digital receiver units 132 are coupled to the ADC 120. Each receiver unit 132 is configured to demodulate a signal modulated by a pseudo-random noise (PRN) code corresponding to a respective GPS satellite. Thus, in an embodiment, each receiver unit 132 corresponds to a respective GPS satellite. In one embodiment, the receiver 100 includes at least four receiver units 132. In various different embodiments, the receiver 100 includes four, five, six, seven, eight, nine, ten, etc., receiver units 132. The plurality of digital receiver units 132 generate a plurality of digital signals corresponding to signals from a plurality of satellites. The plurality of digital signals are provided to a receiver processing unit 140.

Each digital receiver unit 132 includes a plurality of correlators for correlating a received signal against the respective PRN code and a plurality of delayed and advanced versions of the respective PRN code. A receiver processing unit 140 is coupled to the plurality of digital receiver units 132 and receives the outputs of the plurality of correlators. The receiver processing unit 140 utilizes the outputs of the correlators to generate various parameters such as a Doppler shift (frequency offset) and code phase error. Frequency offset is caused, at least in part, by a relative velocity between the satellite and the receiver 100. Code phase error is caused by a variety of factors including a change in the distance between the satellite and the receiver 100.

According to an embodiment, the receiver unit 132 and the receiver processing unit 140 implement a code tracking loop that utilizes a timing error detector that will be described in more detail below. The code tracking loop detects code phase error and utilizes the code phase error to adjust synchronization between a local reference signal and the received signal in an attempt to reduce the code phase error. According to an embodiment, the receiver unit 132 and the receiver processing unit 140 implement a carrier tracking loop that utilizes a carrier loop discriminator. The carrier tracking loop detects carrier offset and utilizes the carrier offset to adjust the frequency for down-conversion of the received signal to reduce carrier offset.

The navigation processing unit 136 receives baseband signals corresponding to signals from a plurality of satellites and parameters generated by the receiver processing unit 140. The navigation processing unit 136 generates a position estimate and provides the position estimate to a user interface 144. In one embodiment, the navigation processing unit 136 generates a velocity estimate and provides the velocity estimate to the user interface 144. In another embodiment, the navigation processing unit 136 does not generate the velocity estimate.

Figure 2:
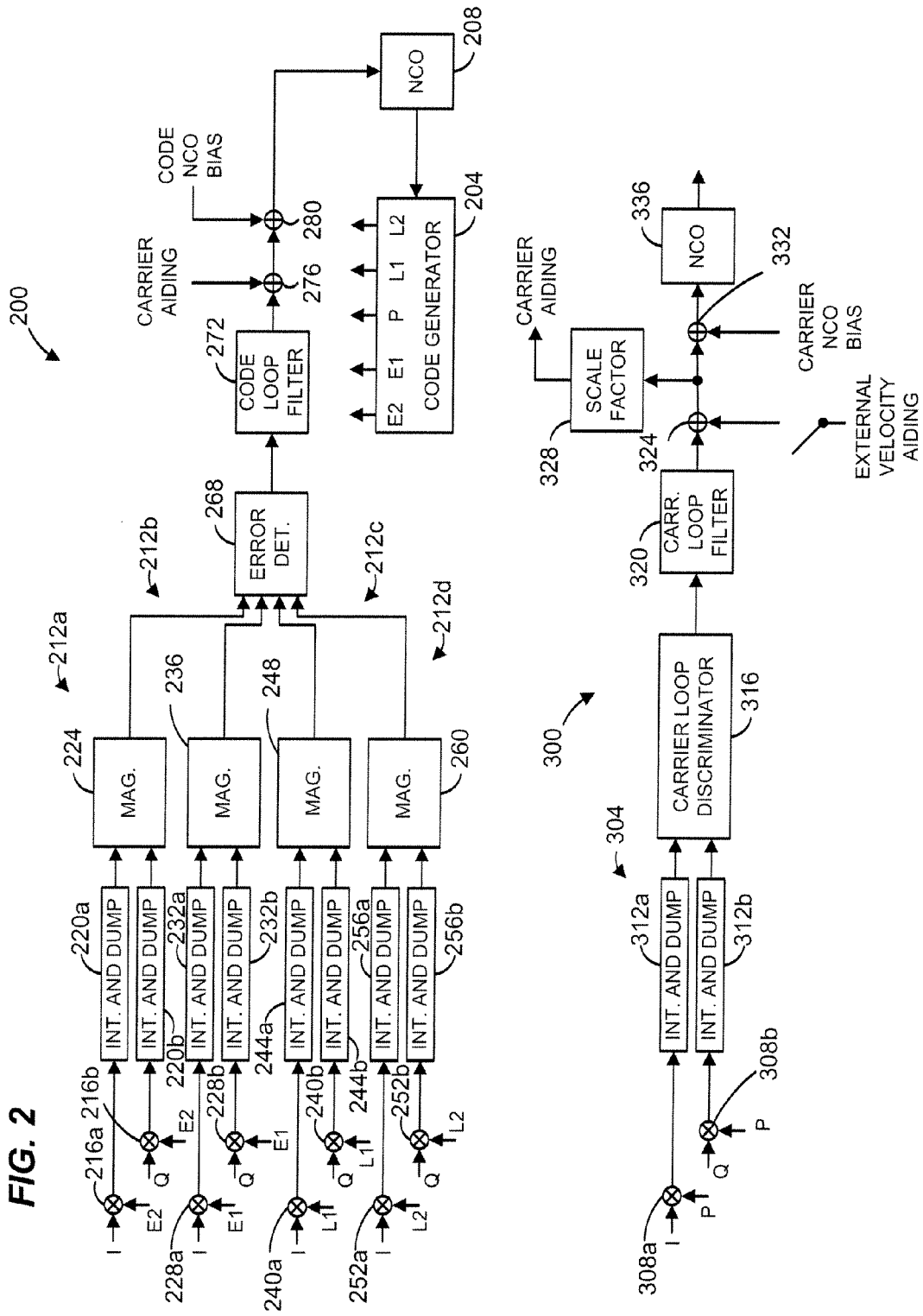
FIG. 2 is a block diagram of an example code tracking loop that is utilized in the GPS receiver of FIG. 1, according to an embodiment.

FIG. 2 is a block diagram of an example code tracking loop 200 that is implemented by the receiver unit 132 and the receiver processing unit 140 of FIG. 1, according to an embodiment. The code tracking loop 200 includes a code generator 204 that generates a plurality of versions of the PRN code corresponding to different delays or advancements of the PRN code in time. The code generator 204 generates a prompt (P) signal, which corresponds to an existing timing of the PRN code. The code generator 204 also generates a first early (E1) signal, which corresponds to an earlier arrival of the PRN code as compared to the P signal. The code generator 204 also generates a second early (E2) signal, which corresponds to an earlier arrival of the PRN code as compared to the E1 signal. The code generator 204 also generates a first late (L1) signal, which corresponds to a later arrival of the PRN code as compared to the P signal. The code generator 204 also generates a second late (L2) signal, which corresponds to a later arrival of the PRN code as compared to the L1 signal. Thus, in one embodiment, five versions of the PRN code signal are generated: E2, E1, P, L1, and L2. In an embodiment, the time spacing between adjacent signals is 0.1 chip, where one chip corresponds to one code phase of the PRN code. In other embodiments, different numbers of signals are generated and/or different spacings are utilized. For example, in one embodiment, three versions of the PRN code signal are generated: E, P, and L. In other embodiments, four, six, seven, eight, etc., versions of the PRN code signal are generated. In another embodiment, the time spacing between adjacent signals is 0.05 chip. In other embodiments, the time spacing between adjacent signals is 0.2 chip, 0.5 chip, etc.

A numerically controlled oscillator (NCO) 208 is coupled to the code generator 204 and controls the timing of the signals generated by the code generator 204. As will be explained below, the code tracking loop 200 utilizes the NCO 208 to attempt to synchronize the P signal with the PRN signals received by the receiver.

The code tracking loop 200 includes a plurality of correlators 212. Correlator 212a correlates the received signal with the E2 signal, and correlator 212b correlates the received signal with the E1 signal. Similarly, correlator 212c correlates the received signal with the L1 signal, and correlator 212d correlates the received signal with the L2 signal. More specifically, the correlators 212 correlates the signals E2, E1, L1, and L2 with baseband I and Q signals, which correspond to the IF signal after down-conversion from IF to baseband and before despreading by the PRN code.

The correlator 212a includes multipliers 216, integrate and dump units 220, and a magnitude calculation unit 224. The multiplier 216a multiplies the I signal with the E2 signal. The integrate and dump unit 220a receives and accumulates the output of the multiplier 216a, resetting to zero at fixed times. The multiplier 216b multiplies the Q signal with the E2 signal, and the integrate and dump unit 220b receives and accumulates the output of the multiplier 216b, resetting to zero at fixed times. The magnitude calculation unit 224 calculates the magnitude of the pair of outputs of the integrate and dump units 220. In one embodiment, the magnitude calculation unit 224 calculates that magnitude as:

$$\text{Magnitude} = \sqrt{A^2 + B^2} \qquad \text{Equ. 1}$$

where A is the output of the integrate and dump unit 220a and B is the output of the integrate and dump unit 220b. In another embodiment, the magnitude calculation unit 224 calculates the magnitude as an approximation, utilizing a suitable approximation such as the Robertson approximation, the JPL approximation, etc. For instance, the Robertson approximation is:

$$\text{if } |A| \le |B|, \text{Magnitude} = |B| + \frac{|A|}{2} \qquad \text{Equ. 2a}$$

$$\text{if } |A| > |B|, \text{Magnitude} = |A| + \frac{|B|}{2} \qquad \text{Equ. 2b}$$

The JPL approximation is:

$$\text{if } X \ge 3Y, \text{Magnitude} = X + \frac{Y}{8} \qquad \text{Equ. 3a}$$

$$\text{if } X < 3Y, \text{Magnitude} = \frac{7X}{8} + \frac{Y}{2} \qquad \text{Equ. 3b}$$

where X is Max(|A|,|B|) and Y is Min(|A|,|B|).

The correlator 212b includes multipliers 228, integrate and dump units 232, and a magnitude calculation unit 236. The multiplier 228a multiplies the I signal with the E1 signal. The integrate and dump unit 232a receives and accumulates the output of the multiplier 228a, resetting to zero at fixed times. The multiplier 228b multiplies the Q signal with the E1 signal, and the integrate and dump unit 232b receives and accumulates the output of the multiplier 228b, resetting to zero at fixed times. The magnitude calculation unit 236 calculates the magnitude of the pair of outputs of the integrate and dump units 232.

The correlator 212c includes multipliers 240, integrate and dump units 244, and a magnitude calculation unit 248. The multiplier 240a multiplies the I signal with the L1 signal. The integrate and dump unit 244a receives and accumulates the output of the multiplier 240a, resetting to zero at fixed times. The multiplier 240b multiplies the Q signal with the L1 signal, and the integrate and dump unit 244b receives and accumulates the output of the multiplier 240b, resetting to zero at fixed times. The magnitude calculation unit 248 calculates the magnitude of the pair of outputs of the integrate and dump units 244.

The correlator 212d includes multipliers 252, integrate and dump units 256, and a magnitude calculation unit 260. The multiplier 252a multiplies the I signal with the L2 signal. The integrate and dump unit 256a receives and accumulates the output of the multiplier 252a, resetting to zero at fixed times. The multiplier 252b multiplies the Q signal with the L2 signal, and the integrate and dump unit 256b receives and accumulates the output of the multiplier 252b, resetting to zero at fixed times. The magnitude calculation unit 260 calculates the magnitude of the pair of outputs of the integrate and dump units 256.

An error detector 268 is coupled to the magnitude calculation units 224, 236, 248, 260, and generates a code phase error based on the outputs of the magnitude calculation units 224, 236, 248, 260. The error detector 268 acts as a discriminator. In an embodiment, the error detector 268 is optimized for multipath scenarios. In one embodiment, the same error detector 268 is utilized when multipath interference is not present, i.e., a line of sight (LOS) scenario. The error detector 268 and generation of code phase error will be described in more detail below.

A code loop filter 272 filters the code phase error, and adders 276 and 280 add a carrier aiding signal and a bias value. The bias value is for setting a frequency of the NCO 208 to the actual PRN chip rate, which is subject to Doppler shift. The carrier aiding signal is a signal generated by a carrier tracking loop 300 and that corresponds to a Doppler shift.

The output of the adder 280 is coupled to the NCO 208, which adjusts the frequency of the NCO 208 output based on the output of the adder 280.

The carrier tracking loop 300 includes a correlator 304, which correlates the baseband I and Q signals with the P signal. The correlator 304 correlates the P signal with baseband I and Q signals, which correspond to the IF signal after down-conversion from IF to baseband and before despreading by the PRN code. The correlator 304 includes multipliers 308 and integrate and dump units 312. The multiplier 308a multiplies the I signal with the P signal. The integrate and dump unit 312a receives and accumulates the output of the multiplier 308a, resetting to zero at fixed times. The multiplier 308b multiplies the Q signal with the P signal, and the integrate and dump unit 312b receives and accumulates the output of the multiplier 308b, resetting to zero at fixed times.

A discriminator 316 calculates estimates of the carrier offset, and a carrier loop filter 320 filters the estimates. An adder 324 adds an external velocity aiding signal and a multiplier 328 multiplies a scaling factor to the output of the adder 324 to generate the carrier aiding signal. An adder 332 adds a bias signal and the output of the adder 332 is provided to a carrier NCO 336. The output of the carrier NCO 336 is utilized to control synthesizers for demodulating the I and Q signals from IF.

In one embodiment, the carrier aiding signal is not generated and the adder 276 and the multiplier 328 are omitted.

Figure 3:
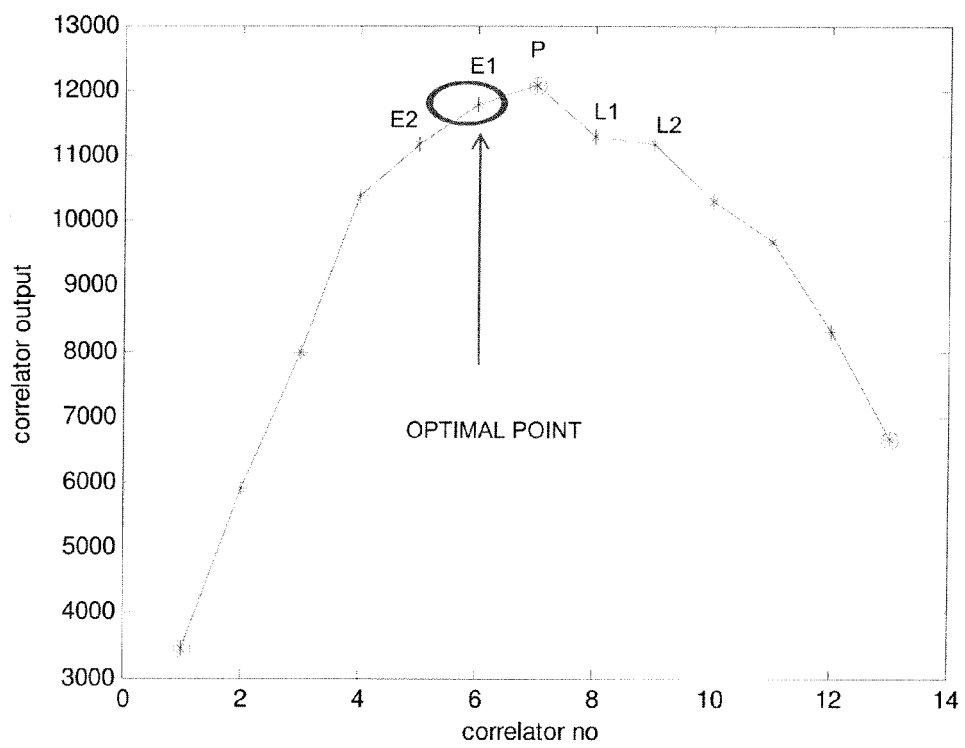
FIG. 3 is a plot of an example correlation function corresponding to a multipath interference scenario.

In an embodiment, the error detector 268 chooses an optimal correlation point that corresponds to an output of one of the magnitude calculation units 224, 236, 248, 260. For example, in one embodiment, the error detector 268 chooses an optimal correlation point that corresponds to one of the magnitude calculation units 224, 236, 248, 260 that has an output greater than the outputs of the other magnitude calculation units 224, 236, 248, 260 (i.e., the magnitude calculation unit 224, 236, 248, or 260 with the maximum output). FIG. 3 is a plot of an example correlation function corresponding to a multipath interference scenario in which the signals E2, E1, P, L1 and L2 have a spacing of 0.1 chips. Correlation points corresponding to E2, E1, P, L1 and L2 are illustrated, where the outputs of the magnitude calculation units 224, 236, 248, 260 correspond to points E2, E1, L1 and L2, respectively. In the example correlation function of FIG. 3, the magnitude calculation unit 224, 236, 248, 260 having the highest output is calculation unit 236, corresponding to E1. Thus, in this scenario, the error detector 268 will generate an error corresponding to E1 with respect to P. For example, if 0.1 chip spacing is utilized, the generated error corresponds to +0.1 chip.

In some embodiments that utilize curve fitting, the optimal correlation point is determined as the point at which a maximum occurs on the curve. In some embodiments, curve fitting is implemented such that a hard or soft limit on the search space for an optimal correlation point is set. For example, boundary conditions for the curve fitting function may include maximum and minimum values for the optimal correlation point and/or the code loop error.

Figure 4:
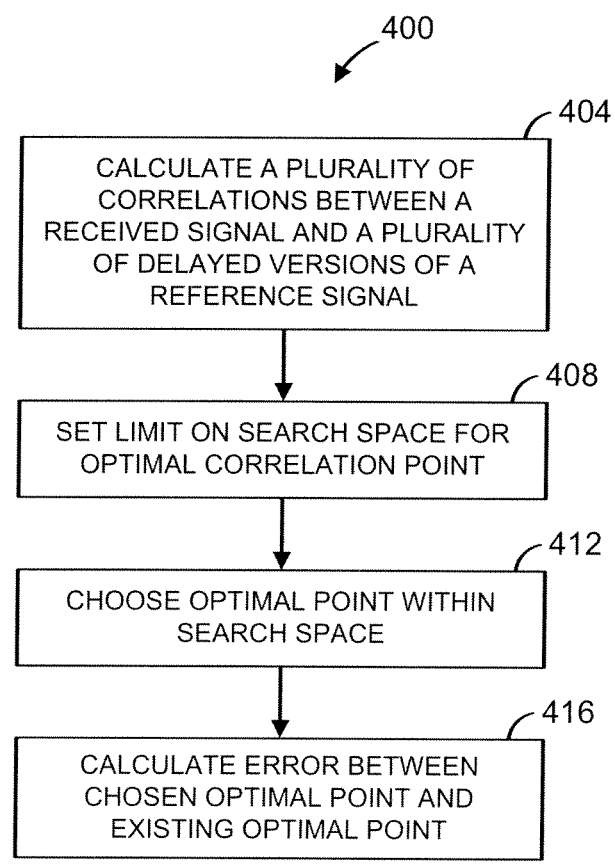
FIG. 4 is a flow diagram of an example method for determining a code loop error, according to an embodiment.

FIG. 4 is a flow diagram of an example method 400 for determining an optimal timing based on a correlation between a received signal and a reference signal, according to an embodiment. The method 400 is implemented by the code tracking loop 200 of FIG. 2, in one embodiment, and the method 400 will be described with reference to FIG. 2 for ease of explanation. In another embodiment, however, the method 400 is implemented by a suitable code tracking loop different than the code tracking loop 200 of FIG. 2. For instance, the method 400 (or a similar method) is implemented in a positioning device for a global or regional positioning system such as the Galileo system or GLONASS, in some embodiments. As another example, the method 400 (or a similar method) is implemented in a device that operates in a CDM or UWB system, in some embodiments.

At block 404, a plurality of correlations between a received signal and a plurality of delayed versions of a reference signal are calculated. For instance, the correlators 212 and the magnitude calculation units 224, 236, 248, 260 generate four correlations between the I and Q signals and the E2, E1, L1, and L2 reference signals.

At block 408, a limit on the search space for an optimal correlation point is set. The limit is a hard limit, in some embodiments, and a soft limit in other embodiments. As just one example, the search space for the optimal correlation point is limited to the outputs of the four magnitude calculation units 224, 236, 248, 260, according to one embodiment. As yet another example, in an embodiment that utilizes curve fitting to find an optimal correlation point, boundary conditions for the curve fitting function may include maximum and minimum values for the optimal correlation point and/or the error between the optimal correlation point and the correlation point corresponding to P.

At block 412, an optimal point within the search space is chosen. For example, the optimal correlation point is chosen to correspond to the calculation unit having the maximum output, according to one embodiment. As another example, in an embodiment that utilizes curve fitting to find an optimal correlation point, a maximum point on the curve is chosen as the optimal point.

At block 416, an error is calculated between the optimal point chosen at block 412 and the current optimal point (e.g., a point that corresponds to the P signal). The current optimal point corresponds to zero error.

Figure 5:
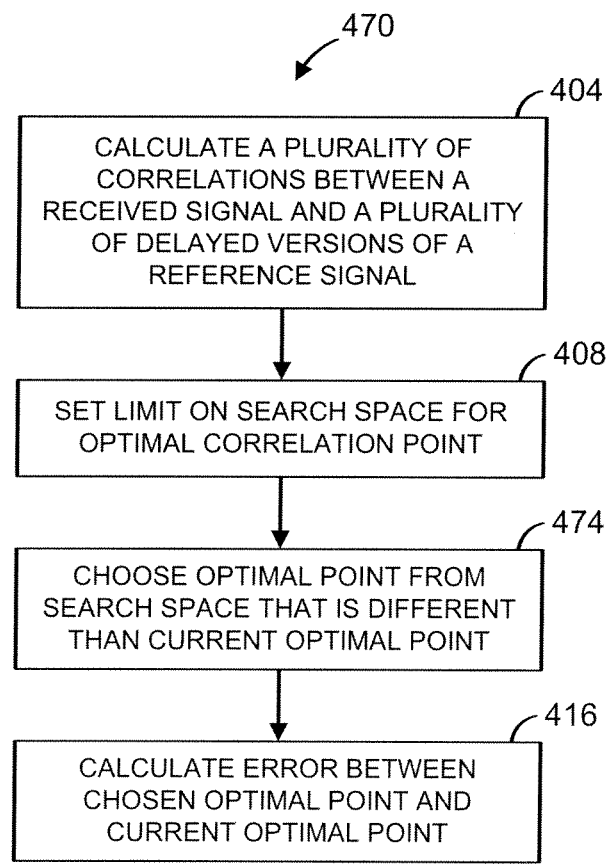
FIG. 5 is a flow diagram of yet another example method for determining a code loop error, according to an embodiment.

FIG. 5 is a flow diagram of another example method 470 for determining an optimal timing for a correlation between a received signal and a reference signal, according to an embodiment. The method 470 is implemented by the code tracking loop 200 of FIG. 2, in one embodiment, and the method 470 will be described with reference to FIG. 2 for ease of explanation. In another embodiment, however, the method 470 is implemented by a suitable code tracking loop different than the code tracking loop 200 of FIG. 2. For instance, the method 470 (or a similar method) is implemented in a positioning device for a global or regional positioning system such as the Galileo system or GLONASS, in some embodiments. As another example, the method 470 (or a similar method) is implemented in a device that operates in a CDM or UWB system. Some blocks of the method 470 are the same as like-numbered blocks in the method 400 of FIG. 4 and will not be discussed further.

At block 474, an optimal point within the search space is chosen such that it is different than the current optimal point (e.g., a point that corresponds to the P signal). For example, referring to FIG. 3, the optimal point cannot be the point P. In one embodiment corresponding to an implementation the same as or similar to FIG. 2, the optimal correlation point is limited to the outputs of the four magnitude calculation units 224, 236, 248, 260 and thus the optimal point is never the point P.

With the method 470, the error determined at block 416 will be non-zero because the chosen optimal point is not the point P. In some embodiments, the error determined at block 416 is limited according to:

$$\text{If error is negative, then neg\_thresh\_1} \leq \text{error} \leq \text{neg\_thresh\_2} \qquad \text{Equ. 4a}$$

$$\text{If error is positive, then pos\_thresh\_1} \leq \text{error} \leq \text{pos\_thresh\_2} \qquad \text{Equ. 4b}$$

where neg_thresh_1 and neg_thresh_2 are limiting thresholds when the error is negative, and pos_thresh_1 and pos_thresh_2 are limiting thresholds when the error is positive. The thresholds neg_thresh_2 and post_thresh_1 are both non-zero and thus ensure that the error will be non-zero. In some embodiments, the error determined at block 416 is limited according to:

$$\text{thresh\_1} \leq |\text{error}| \leq \text{thresh\_2} \qquad \text{Equ. 5}$$

where thresh_1 and thresh_2 are limiting thresholds on the absolute value of the error. The threshold thresh_1 is non-zero and thus ensures that the error will be non-zero. In other embodiments, soft-thresholds are utilized.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. Likewise, the software or firmware instructions may be delivered to a user or a system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software or firmware instructions may be delivered to a user or a system via a communication channel such as a telephone line, a DSL line, a cable television line, a fiber optics line, a wireless communication channel, the Internet, etc. (which are viewed as being the same as or interchangeable with providing such software via a transportable storage medium). The software or firmware instructions may include machine readable instructions that, when executed by the processor, cause the processor to perform various acts.

When implemented in hardware, the hardware may comprise one or more of discrete components, an integrated circuit, an application-specific integrated circuit (ASIC), etc.

While the present invention has been described with reference to specific examples, which are intended to be illustrative only and not to be limiting of the invention, it will be apparent to those of ordinary skill in the art that changes, additions and/or deletions may be made to the disclosed embodiments without departing from the spirit and scope of the invention.

What is claimed is:

1. A receive system, comprising:
   a code generator configured to generate a reference signal and a plurality of delayed versions of the reference signal, wherein the reference signal corresponds to a current optimal timing of a code tracking loop;
   a plurality of correlators configured to correlate a received signal with the plurality of delayed versions of the reference signal to generate a first plurality of correlator outputs, wherein the first plurality of correlator outputs does not include a correlator output corresponding to the reference signal;
   a timing error detector configured to
       choose a new optimal timing that corresponds to a highest output of the first plurality of correlator outputs, and
       determine a timing error based on (i) the new optimal timing and (ii) the current optimal timing;
   wherein the code generator is configured to adjust synchronization between the reference signal and the received signal to reduce the timing error, for a second plurality of correlator outputs generated by the plurality of correlators, based on the new optimal timing; and
   wherein the code tracking loop includes the code generator, the plurality of correlators, and the timing error detector.

2. The receive system according to claim 1, wherein the received signal is a global positioning system (GPS) signal transmitted by a satellite.

3. The receive system according to claim 1, wherein the received signal is a code division multiplexing signal.

4. The receive system according to claim 1, wherein the received signal is a ultra wide band signal.

5. A method, comprising:
   receiving a signal;
   generating a reference signal and a plurality of delayed versions of the reference signal, wherein the reference signal corresponds to a current optimal timing of a code tracking loop;
   correlating the received signal with the plurality of delayed versions of the reference signal to generate a first plurality of correlator outputs, wherein the first plurality of correlator outputs does not include a correlator output corresponding to the reference signal;
   choosing a new optimal timing that corresponds to a highest output of the first plurality of correlator outputs;
   determining a timing error based on (i) the new optimal timing and (ii) the current optimal timing; and
   adjusting synchronization between the reference signal and the received signal to reduce the timing error, for a second plurality of correlator outputs, based on the new optimal timing.

6. The method according to claim 5, wherein the received signal is a global positioning system (GPS) signal transmitted by a satellite.

7. The method according to claim 5, wherein the received signal is a code division multiplexing signal.

8. The method according to claim 5, wherein the received signal is a ultra wide band signal.

9. A positioning system receiver, comprising:
   a plurality of receiver channel blocks corresponding to a plurality of satellites;
   a receiver processing block including a code tracking loop, the code tracking loop including:
       a code generator configured to generate a reference signal and a plurality of delayed versions of the reference signal, wherein the reference signal corresponds to a current optimal timing of a code tracking loop;
       a plurality of correlators configured to correlate a received signal with the plurality of delayed versions of the reference signal to generate a first plurality of correlation outputs, wherein the first plurality of correlator outputs does not include a correlator output corresponding to the reference signal, and
       a tracking error detector configured to
           choose a new optimal timing based on a set of correlation points, wherein the set of correlation points is based on the first plurality of correlation outputs, and wherein the tracking error detector is configured to choose the new optimal timing by choosing a correlation point, of the set of correlation points, that corresponds to a highest output of the first plurality of correlation outputs, and
           determine a code tracking error based on (i) the new optimal timing and (ii) the current optimal timing; and
   wherein the code generator is configured to adjust synchronization between the reference signal and the received signal to reduce the code tracking error, for a second plurality of correlator outputs generated by the plurality of correlators, based on the new optimal timing.

* * * * *